G. W. NEAL.
PEACH SLICER AND SEEDER.
APPLICATION FILED FEB. 27, 1914.
1,129,894.
Patented Mar. 2, 1915.
2 SHEETS—SHEET 2.
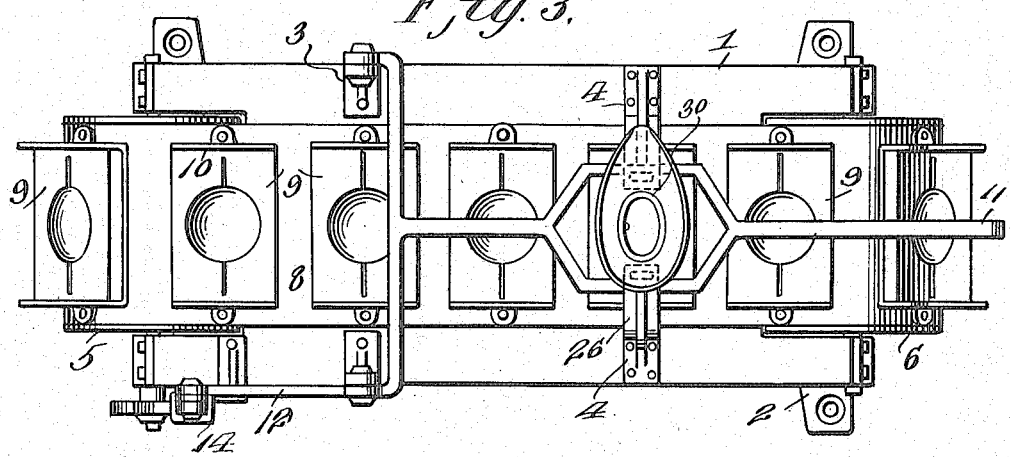
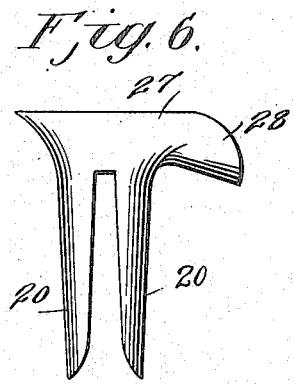
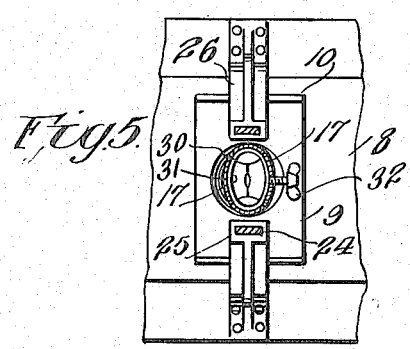
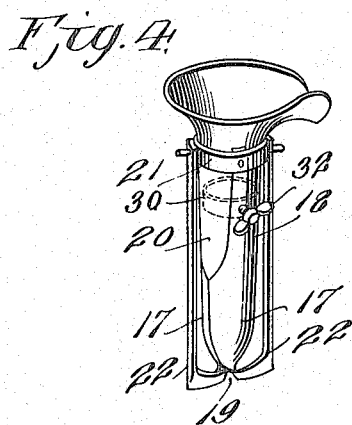
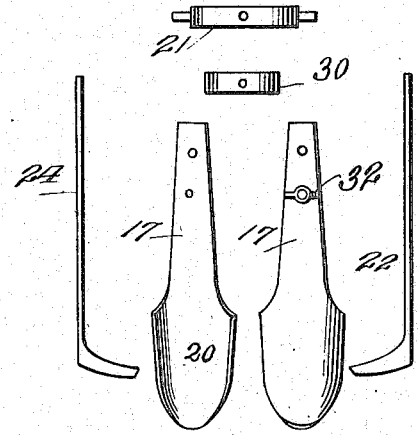
Witnesses
Frank Hough
V. B. Hillyard
Inventor
George W. Neal,
By Victor J. Evans
Attorney

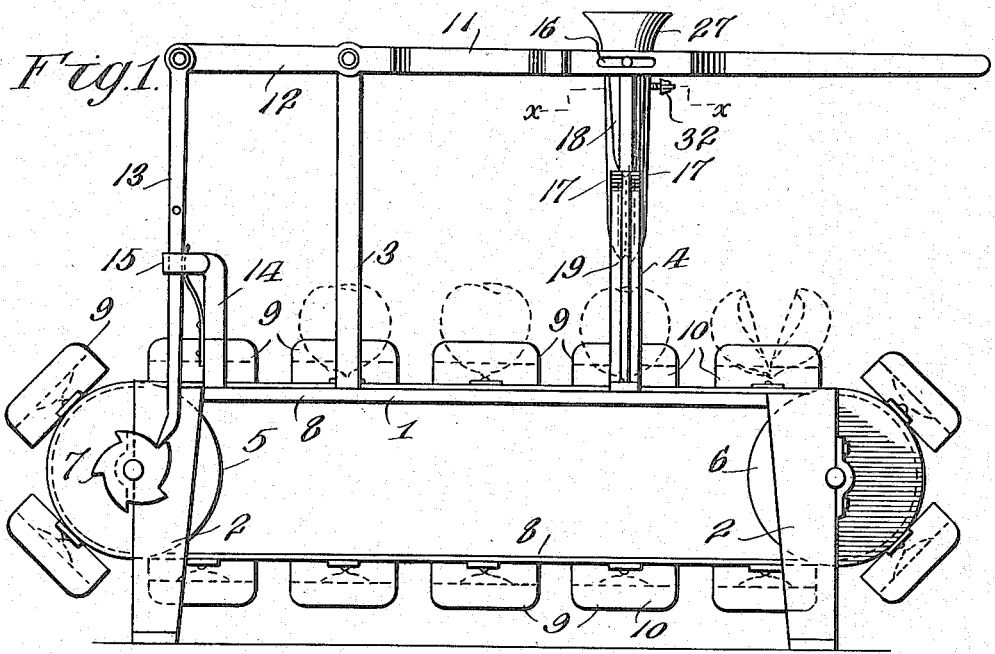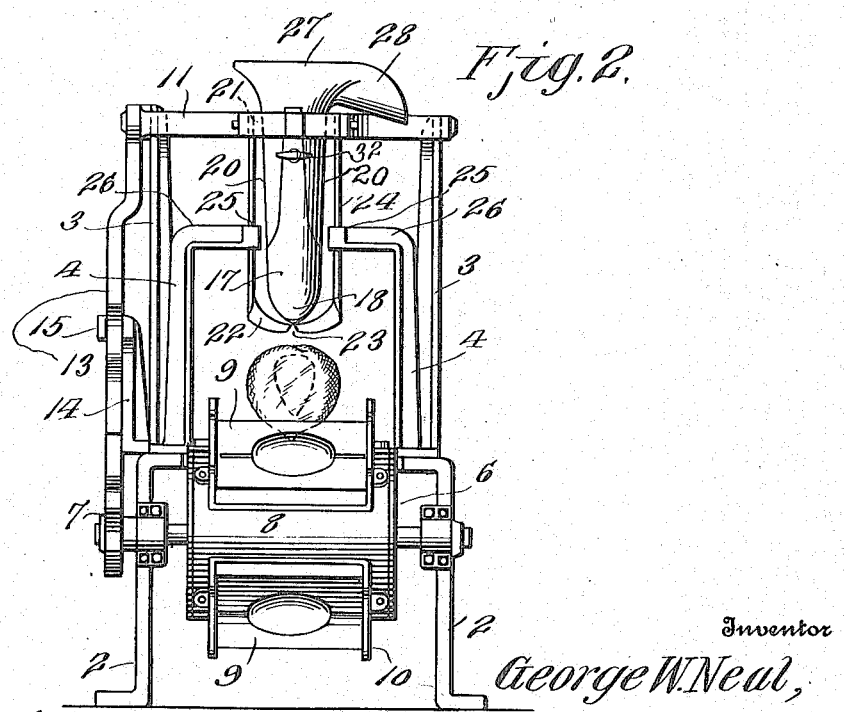

UNITED STATES PATENT OFFICE.

GEORGE WASHINGTON NEAL, OF CLARKSVILLE, ARKANSAS.

PEACH SLICER AND SEEDER.

1,129,894.  Specification of Letters Patent.  Patented Mar. 2, 1915.

Application filed February 27, 1914. Serial No. 821,499.

*To all whom it may concern:*

Be it known that I, GEORGE W. NEAL, a citizen of the United States, residing at Clarksville, in the county of Johnson and State of Arkansas, have invented new and useful Improvements in Peach Slicers and Seeders, of which the following is a specification.

The invention provides a machine for removing the stone or kernel from such fruit as the peach or apricot, and at the same time separating the fruit into halves or sections.

The invention provides a seeder and cutter of novel form which at a single operation divides the fruit and removes the kernel or seed therefrom.

The invention further consists of an endless carrier, of novel structure, which is adapted to receive the fruit and advance the same to the seeder and cutter and deliver such fruit after the seeding and cutting operation, at a predetermined point to a receptacle by means of which the fruit may be removed to a convenient point for subsequent treatment.

The invention further consists of novel actuating means between the endless carrier and seeder, whereby both are operated in unison, such means serving to transmit movement from one part to the other.

The invention also further consists of the novel features, details of construction and combination of parts, which hereinafter will be more particularly set forth, illustrated and claimed.

In the drawings hereto attached:—Figure 1 is a side view of a machine for dividing and removing the kernel from a peach or like fruit. Fig. 2 is an end view. Fig. 3 is a top view. Fig. 4 is a detail view of the combined divider and seeder. Fig. 5 is a horizontal section of the machine on the line $x$—$x$ of Fig. 1. Fig. 6 is a detail view of the combined divider and seeder with the several parts separated and arranged in a group.

Corresponding and like parts are referred to in the following description and indicated in all the views of the drawings, by the same reference characters.

The framework of the machine comprises a top 1, legs 2 and uprights 3 and 4. Drums 5 and 6 are secured to shafts which are mounted in bearings at opposite ends of the framework. The shaft of one of the drums has a ratchet wheel 7 secured to a projecting end thereof. An endless apron 8 is mounted upon the drums 5 and 6 and is adapted to be intermittently operated. The upper portion of the apron 8 is supported upon the top 1. A plurality of receptacles 9 are secured to the apron 8, such receptacles being in the nature of blocks in the outer side of which are formed cavities of a shape to receive the end of a peach or like fruit. Plates 10 are secured to opposite sides of the blocks or receptacles 9 and their edges project a short distance above such blocks to engage the fruit and retain the same in place after being cut.

A lever 11 is fulcrumed to the upper ends of the uprights 3, its rear portion being forked and such forked members being pivotally connected to the uprights 3. One of the forked members is formed with an extension 12 to the outer end of which a pawl 13 is pivotally connected. A standard 14 secured at its lower end to the main frame is provided at its upper end with a guide 15 which directs the pawl 13 in its reciprocating movements. The lower end of the pawl 13 is adapted to engage the teeth of the ratchet wheel 7. When the front end of the lever 11 is elevated its rear end is depressed, thereby lowering the pawl 13 and causing the ratchet wheel 7 to move whereby the endless carrier comprising the apron 8 and receptacle 1 is moved a distance to bring the fruit in position to be acted upon by the divider and seeder. The lever 11 is formed with an eye or open portion 16 which receives the upper end of the divider and seeder.

The seeder comprises two opposed members 17 which are provided at their lower ends with spoon shaped portions 18 which have their edge portions meeting on a medial line, the extremities of such spoon shaped portions being beveled to provide a flaring space 19 whereby the end of the kernel or seed is adapted to readily enter the space formed between the members 17 and whereby further the extremities of such members are adapted to ride upon the kernel or stone during the operation of removing the same from the fruit. Other members 20 have an opposite arrangement and are located opposite the spaces formed between the members 17.

The several members 18 and 20 form an approximate tubular seeder which tapers slightly in its length, said members being of such construction as to separate their lower ends to pass over the kernel or seed during the operation of the device when removing the kernel from the fruit. A band 21 connects the upper ends of the members 17 and 20. Blades 22 are located upon opposite sides of the seeder at the extremity thereof and serve to divide the fruit. The edges of the blades 22 are oppositely inclined and their inner ends are oppositely beveled to form a flaring space 23 which admits of the end of the kernel passing between the blades when the device is lowered. Spring arms 24 connect the blades 22 with the band 21 and such spring arms serve to hold the blades in a given position and enable the same to ride upon the kernel in the operation of the machine. The spring arms 24 are located exterior to the members 20 and pass through guides 25 at the inner ends of arms 26 projecting inward from the upper ends of the uprights 4. The band 21 is connected to the lever 11 so as to move therewith and is arranged in the eye or space 16 and is connected to the side portions of such eye so as to admit of the proper operation of the seeder and cutter when the machine is in action. A bell shaped member 27 attached to the band 21 is formed with a spout 28 by means of which the kernels or stones are discharged laterally from the machine.

It is to be understood that the machine may be operated in any manner and for the sake of simplicity of illustration the lever 11 is adapted to be moved by hand. The fruit to be divided and seeded is placed on end in the receptacle 9 of the endless carrier and upon moving the outer end of the lever 11 upward the pawl 13 is depressed and causes a partial rotation of the ratchet wheel 7 and endless carrier, the parts being so proportioned and arranged that at each upward movement of the outer end of the lever 11 the endless carrier will be moved a distance to bring a receptacle in position beneath the combined seeder and divider so that when the outer end of the lever 11 is depressed the fruit will be separated and the kernel thereof removed. When the outer end of the lever 11 is depressed and the extremities of the members 18 and 20 and the blades 22 are caused to enter the fruit and ride upon the kernel thereof, the blades 22 dividing the fruit and the members 18 and 22 separating the meat from the stone, the latter passing into the tubular space inclosed by the members 18 and 20. The fruit thus divided and separated from the kernel is moved forward by the endless carrier and is finally deposited in a receptacle, not shown, suitably placed to receive the same. The kernels or stones removed from the fruit collect in the space inclosed by the members 18 and 20 and finally in the part 27 and are discharged therefrom by means of the spout 28 and drop upon the floor or into a suitable receptacle, not shown, arranged to receive the same.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

While the machine is particularly adapted for removing the seed from such fruit as the peach or apricot it is to be understood that it may be utilized for removing the core from apples or like fruit. It may be desirable at times to regulate the space 19 or distance between the penetrating ends of the spoon shaped portions 18 of the members 17 and this may be accomplished by means of a band 30 which may be secured to one of the members 17 by means of a rivet or fastening 31, a set screw 32 being applied to the opposite members 17 to engage the band 30 so as to regulate the closing of the two members when pressed together. The band 30 provides for the escape of the seeds, core or the like through the tubular extractor when the machine is in operation.

Having thus described the invention what is claimed as new, is:—

In an extractor for removing the seed or core from fruit, the same comprising laterally movable members, a band arranged between such members and an adjustable stop coöperating with the band and members to admit of regulating the closing of such members to vary the distance between their penetrating ends.

In testimony whereof I affix my signature in presence of two witnesses.

GEORGE WASHINGTON NEAL.

Witnesses:
LEILA THOMPSON,
W. A. RAGEN.